United States Patent
Rosenbloom et al.

(10) Patent No.: US 7,254,816 B2
(45) Date of Patent: Aug. 7, 2007

(54) DEVICE DRIVER CONVERSION AND CREATION

(75) Inventors: Oren Rosenbloom, Redmond, WA (US); Lyman Cooper Partin, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 907 days.

(21) Appl. No.: 10/429,441

(22) Filed: May 5, 2003

(65) Prior Publication Data

US 2004/0226024 A1 Nov. 11, 2004

(51) Int. Cl.
- *G06F 3/01* (2006.01)
- *G06F 9/305* (2006.01)
- *G06F 13/10* (2006.01)
- *G06F 9/45* (2006.01)

(52) U.S. Cl. .................................. 719/327; 719/321

(58) Field of Classification Search ......... 719/321–327
See application file for complete search history.

(56) References Cited

U.S. PATENT DOCUMENTS

| | | | | |
|---|---|---|---|---|
| 5,729,748 A * | 3/1998 | Robbins et al. | ............. | 717/137 |
| 6,489,973 B1 * | 12/2002 | Heiden | ........................ | 715/771 |
| 6,810,517 B2 * | 10/2004 | Bond et al. | .................. | 717/138 |
| 7,117,486 B2 * | 10/2006 | Wong et al. | ................. | 717/141 |
| 2002/0144242 A1 * | 10/2002 | Owhadi | ....................... | 717/137 |
| 2003/0056203 A1 * | 3/2003 | Micco et al. | ................ | 717/137 |
| 2003/0101438 A1 * | 5/2003 | Mishra et al. | .............. | 717/136 |
| 2004/0168124 A1 * | 8/2004 | Beisiegel et al. | ........... | 715/513 |
| 2005/0125811 A1 * | 6/2005 | Fleegal | ........................ | 719/328 |

* cited by examiner

*Primary Examiner*—William Thomson
*Assistant Examiner*—Richard Pantoliano, Jr.
(74) *Attorney, Agent, or Firm*—Shook, Hardy & Bacon LLP

(57) ABSTRACT

A computer-implemented method and system useful in creating a device driver of a different architecture, based upon an existing driver of an original architecture. Information concerning an existing device driver is gathered. This information is stored for use by a transformation engine. The transformation engine maps information from the existing driver architecture to a new driver architecture. The transformation engine is used to obtain a description of the old driver in a format specific to the new driver architecture. A source code generation engine then converts the information obtained from the transformation engine into a new driver application layer. Given the base driver with the application layer already developed, a device provider or other driver creator can develop the device protocol layer for the driver.

14 Claims, 4 Drawing Sheets

```
<twainMapper>
<properties>
<property twain= "ICAP_IMAGEFILEFORMAT">
  <Map wia= "WIA_IPA-FORMAT" type= "valueMapping" container= "list" dataType=
"VT_CLSID">
    <value twain= "TWFF_TIFF" wia= "WiaImgFmt_TIFF"><value>
    <value twain= "TWFF_PICT" wia= "WiaImgFmt_PICT"></value>
    <value twain= "TWFF_BMP" wia= "WiaImgFmt_BMP"><value>
    <value twain= "TWFF_JFIF" wia= "WiaImgFmt_JPEG"></value>
    <value twain= "TWFF_FPX" wia= "WiaImgFmt_FLASHPIX"></value>
    <value twain= "TWFF_PNG" wia= "WiaImgFmt_PNG"></value>
    <value twain= "TWFF_EXIF" wia= "WiaImgFmt_EXIF"></value>
  </map>
</property>
 . . .
</properties>
</twainMapper>
```

FIG. 4.

```
<WIADriver>
<properties>
<property name= "WIA_IPA_FORMAT" access= "RWLorRWR" type= "VT_CLSID">
    <initialValue/>
    <child/>
    <values container= "list" flatbed= "yes" flatbedADF= "yes" feederOnly= "yes" unknownLengthFeederOnly= "yes">
        <value>WiaImgFmt_BMP</value>
        <value>WiaImgFmt_TIFF</value>
        <default>WiaImgFmt_BMP</default>
    </values>
    <listName>m_SupportedFileFormats</listName>
</property>
...
</properties>
</WIADriver>
```

FIG. 5.

DEVICE DRIVER CONVERSION AND CREATION

CROSS-REFERENCE TO RELATED APPLICATIONS

None.

STATEMENT REGARDING FEDERALLY SPONSORED RESEARCH OR DEVELOPMENT

None.

TECHNICAL FIELD

In general, the present invention relates to computer software, and more particularly, to a method and system for porting device drivers from one architecture to another.

BACKGROUND OF THE INVENTION

Within the computing field, drivers are used to control or regulate another device. A software driver or device driver is a device-specific control program that enables a computer to work with a particular device, such as a printer or scanner. The device driver permits the computer system to communicate with the specific device. Because the driver handles device-specific features, the operating system is freed from the burden of having to understand and support the needs of the individual hardware devices. This is particularly important, given the number of different hardware devices currently being utilized.

The device drivers are typically developed based on a standard communication protocol. These protocols define a set of rules or standards upon which the drivers are written. As computer systems evolve, additional and different protocols can develop. The use of one protocol over another to develop a driver may expose or make available additional, desirable features of the device to which the driver pertains. As an example, within the imaging device context, drivers are currently being developed based upon the protocols known as TWAIN (Technology Without An Interesting Name) and WIA (Windows Imaging Acquisition).

For a device provider, such as an independent hardware vendor or IHV, it may be desirable to develop drivers based upon the WIA protocol rather than, or in addition to, the TWAIN protocol. It is often the case that the device provider will already have in place an existing driver based upon one protocol, such as the TWAIN protocol. But it is currently a non-trivial task to port existing drivers built on one protocol to a different protocol. The person tasked with the creation of a new driver based upon a driver from a different protocol must necessarily understand the technology associated with the existing driver. However, it is often the case that the developers of the existing driver are not the same individuals tasked with the creation of the new driver. Therefore, the developer of the new driver must first learn and understand the underlying architecture of the existing driver. At the same time, the developer must also understand the additional or new protocol architecture. Thus, although it is desirable to develop drivers in new architectures based upon existing drivers, it is currently a time-consuming and difficult task.

It is often the case that drivers have at least two layers. The top layer is a Device Driver Interface (DDI) layer, or application layer, and the bottom layer is the device protocol layer. Typically the operating system and/or applications interact with the driver via the DDI layer and the device protocol layer handles communication with the device. When the operating system wishes to communicate with the device, it makes a request via the DDI layer. The DDI layer then forwards this request to the device protocol layer. The device protocol layer converts the request into a device protocol specific request and then sends the request to the device. Similarly, when the device wishes to send an event to the operating system, the device protocol layer receives the event from the device, converts it to a DDI layer event and then forwards it to the DDI layer. The DDI layer is then responsible for notifying the operating system, which in turn notifies the intended recipient application.

It would therefore be beneficial to provide a method and a tool that facilitates the creation of device drivers based upon existing device drivers of a different architecture. A method and tool are needed that can create a base application layer for a device driver, given an existing driver of a different architecture. Given such a base application layer, a device provider can more easily port drivers from one architecture to another.

BRIEF SUMMARY OF THE INVENTION

The present invention is directed to a method and computer application for porting drivers from one architecture to another.

More specifically, the present invention provides a method and tool for use in creating a device driver of a different architecture based upon an existing driver of an original architecture. Information concerning an existing device driver is gathered. This information is stored for use by a transformation engine. The transformation engine maps information from the existing driver architecture to a new driver architecture. The transformation engine is used to obtain a description of the old driver in a format specific to the new driver architecture. A source code generation engine then converts the information obtained from the transformation engine into a new driver application layer. Given the base driver with the application layer already developed, a device provider or other driver creator can develop the device protocol layer for the driver.

Additional advantages and novel features of the invention will be set forth in the description which follows, and in part will become apparent to those skilled in the art upon examination of the following, or may be learned from practice of the invention.

BRIEF DESCRIPTION OF THE SEVERAL VIEWS OF THE DRAWINGS

The present invention is described in detail below with reference to the attached drawing figures, wherein:

FIG. 4 is an exemplary portion of a driver transformation document in XML syntax; and FIG. 5 is an exemplary portion of a driver description in the new protocol.

DETAILED DESCRIPTION OF THE INVENTION

The present invention provides a method and tool for use in creating a device driver of a different architecture based upon an existing driver of an original architecture. Using this method and tool, new and additional device drivers can be created more efficiently utilizing the information obtained from an existing device driver. In implementation, an existing device driver is interrogated and information is gathered concerning the existing device driver. This information is stored for use by a transformation engine. The transformation engine contains a mapping infrastructure that matches the existing driver architecture against the new driver architecture. By applying the transformation engine, information is obtained specific to the new driver architecture. A source code generation engine is then employed to convert the information obtained from the transformation engine into a new driver having an application layer. This new driver thus utilizes the new architecture. Given the base driver with the application layer already developed, a device provider or other driver creator can develop the device protocol layer for the driver. The tool thus has the ability to ask the right questions of the old driver so that a new driver can be created or developed.

Having briefly described an embodiment of the present invention, an exemplary operating environment for the present invention is described below.

Exemplary Operating Environment

Figure 1:
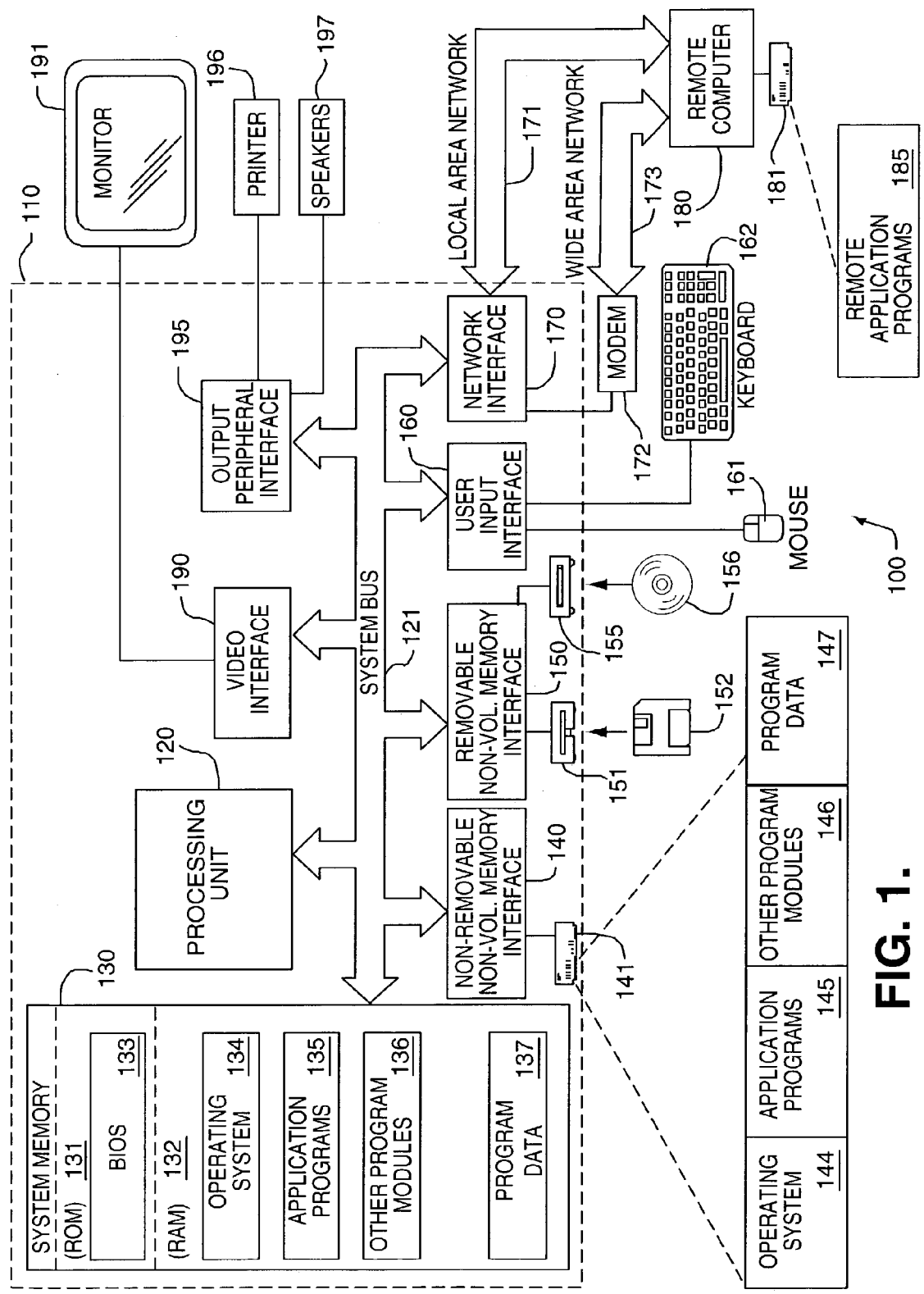
FIG. 1 is a block diagram of a computing system environment suitable for use in implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing and using the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

System and Method for Porting Drivers

To better describe the invention, two driver architectures will be used as an example. It should be understood that the invention is not limited to the particular architectures that are discussed, and that the invention is applicable to architectures other than those discussed. As mentioned above, an architecture known as TWAIN is currently used to allow communication between software applications and image acquisition devices. A TWAIN driver has a description or specification that describes a feature set of the device to which the driver pertains. The feature set includes attributes of the device, commands and events. Attributes of the device include such things as the dots per inch or DPI for a scanner. Commands are instructions that are accepted by or that can be sent to the device, such as "scan." Events are notifications that the device can send to the computer, to inform the system of events, such as "user pressed scan button."

The invention, as described below, determines the feature set of the TWAIN driver and converts that feature set into an application layer for a driver based upon a different architecture, such as WIA. This new application layer reports the same features as the existing TWAIN driver. The driver creator, such as an independent hardware vendor (IHV), can then develop the device protocol layer to create a new WIA driver based upon the existing TWAIN driver. This device protocol layer is basically the layer that makes the hardware move or otherwise perform. The IHV can more easily create this layer. At the end of the process, the IHV will have both the existing TWAIN driver and the new WIA driver, making the IHV device compatible with a larger number of applications and possibly exposing additional features and functionality.

Figure 2:
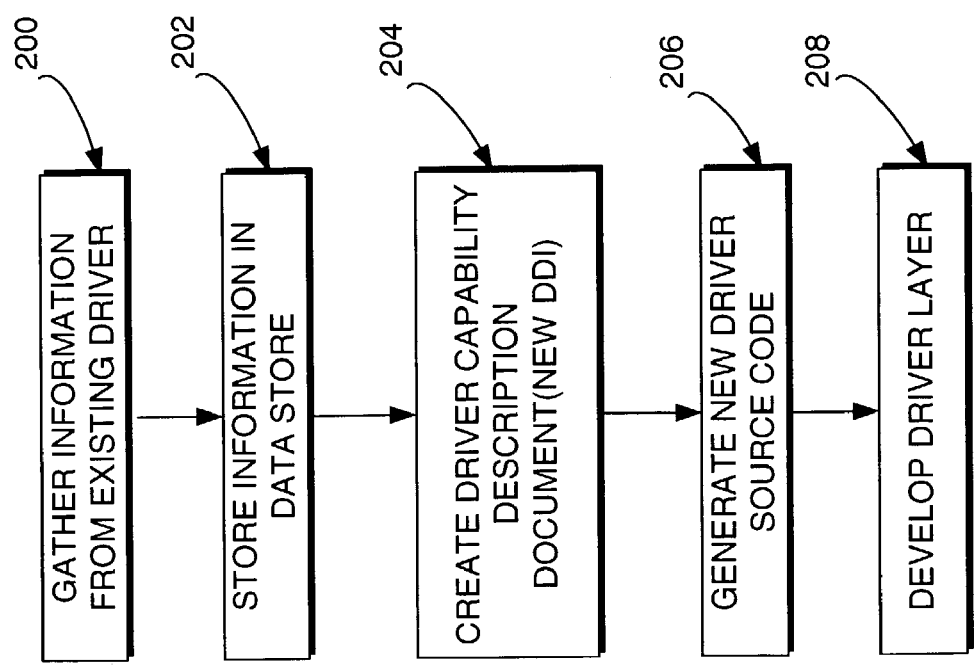
FIG. 2 is a flow chart illustrating certain aspects of the present invention.

As best seen in FIG. 2, a flow chart illustrating a method of the present invention is shown. The method begins at 200 with the gathering of information from the existing driver. This information includes, but is not limited to, the attributes, events and commands associated with the driver. Once all of the available driver information is gathered, a data store is created in a more common format, as shown at step 202. In other words, driver specific information is made available in a readable format that describes the capabilities of the existing driver. As shown at 204, the data store created in step 202 is then used to create a description of the capabilities of the driver in a format specific to the new architecture. This description describes the data store in the new-architecture-specific terms. Given the new driver capability description document, the method continues by generating new driver source code, as shown at 206. The source code generated at 206 is the application or DDI layer for the new driver. Along with the application layer, an installation requirements package is also created. Given this source code, the IHV can develop the device protocol layer for the driver, as shown at 208. At this point, a complete, new driver exists based upon the new architecture which was created using information gathered from the existing device driver.

As an example, if a TWAIN driver exists for a particular device, the method of FIG. 2 can be used to create a WIA driver. In step 200, information is gathered from the TWAIN driver as to its particular feature set. The attributes, commands and events of the TWAIN driver are thus known following step 200. This information is stored in step 202 in the common data store in an extensible mark-up language (XML) file. This common data store file is then converted or transformed into a file containing a WIA specific description matching the TWAIN specific description at step 204. Using this WIA specific description, source code is generated for the WIA application layer for the driver at step 206. The device protocol layer is then created for the driver at step 208.

Figure 3:
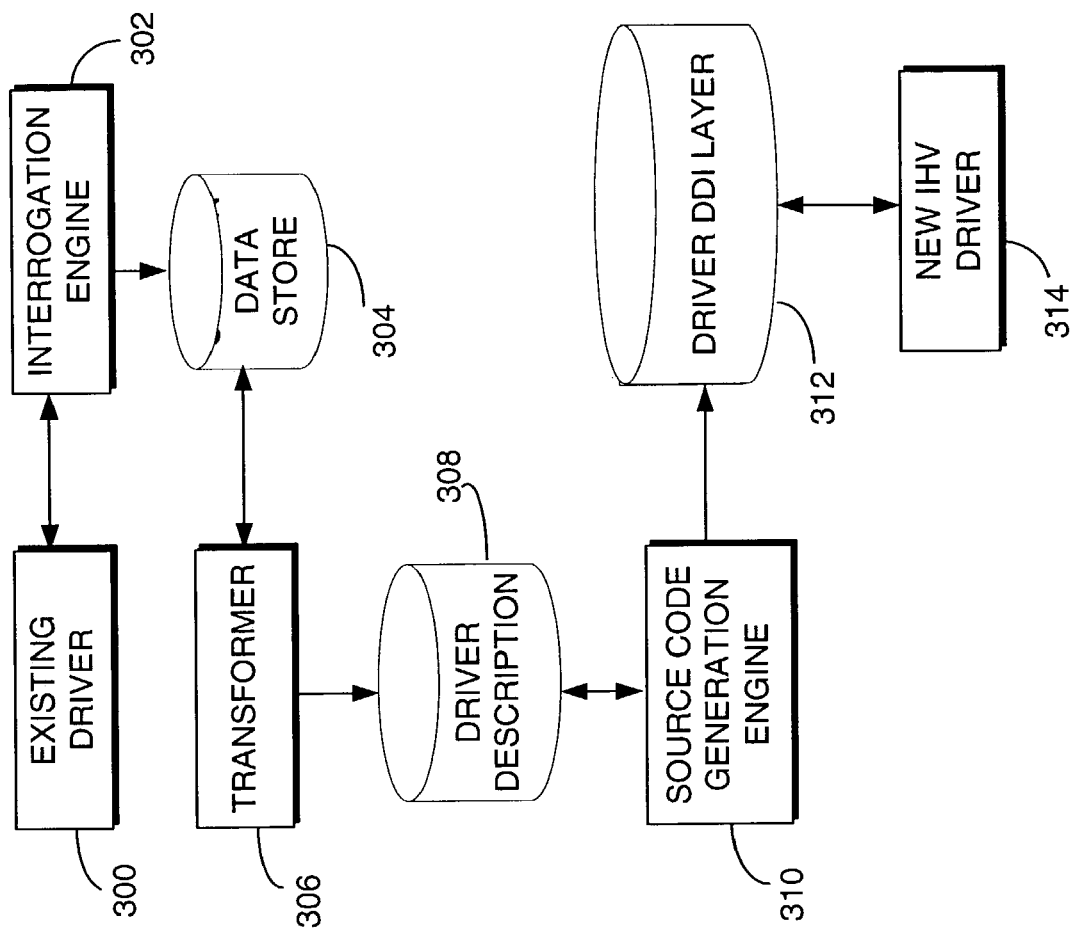
FIG. 3 is a schematic view of the basic components in one embodiment of the present invention.

The above process of FIG. 2 is implemented by the components shown schematically in FIG. 3. As a starting point, an existing driver 300 is examined by an interrogation engine 302. The interrogation engine 302 is a driver information-gathering component. The engine 302 is architecture-aware regarding the architecture upon which the driver 300 is based. Continuing with the above example, the engine 302 is capable of asking questions specific to the TWAIN architecture to extract all of the information available from driver 300. It should again be understood that the invention is not limited to an engine 302 that is merely TWAIN-aware. The engine 302 is constructed to be aware of the architecture upon which the driver 300 is based. After interrogation, the engine will have extracted the data regarding the attributes, events and commands of the driver 300.

The engine 302 then creates a driver capability description document in a format commonly readable. This document is stored in a common data store 304. As an example, the driver capability description document can be created and stored as an XML file. As a more specific example, a device is interrogated that has, as part of its description, the ability to support TIFF and BMP file transfers with an existing TWAIN driver. The portion of the driver capability description document would appear in an XML file as follows:

```
<twainData>
    <capability id = "ICAP_IMAGE_FILE_FORMAT">
        <value twain= "TWFF_TIFF"</value>
        <value twain= "TWFF_BMP</value>
    </capability>
    ...
</twainData>
```

Again, the above is merely an exemplary portion of the driver capability description and is not meant to be limiting in any way. The complete driver capability description will contain all of the information about the feature set of the existing driver.

With continuing reference to FIG. 3, a transformer component 306 is shown. Transformer 306 converts the driver capability description document into a driver description in the new architecture format. The transformer 306 holds the relationship key between the existing driver format and the new driver format. This relationship key therefore has a listing of possible driver description points in the existing driver architecture and corresponding description points in the new architecture. An exemplary portion of a transformation document or transformer 306, in XML syntax, is shown in FIG. 4. As shown in FIG. 4, the transformer maps a specific TWAIN value to a corresponding WIA value. Transformer 306 is thus developed with specific knowledge of both the existing driver architecture and the new driver architecture. For each descriptive point in the existing driver architecture, a corresponding descriptive point in the new driver architecture is included.

The transformer 306 thus creates a new driver description in the new architecture. In the specific example above, the transformer 306 creates a new driver description document in the WIA architecture. All of the attributes, events and commands of the driver 300 are described in the new architecture at this point. Continuing with the example, the attributes, events and commands of the existing TWAIN driver are described in the WIA architecture. The new driver description is stored in the database labeled 308 in FIG. 3. An exemplary portion of a new driver description document is shown in FIG. 5. As can be seen, the line "<value>WiaImgFmt_BMP</value>" is a description of the driver in WIA architecture for a device that supports BMP file transfers. This description is obtained from the mapping of the transformer document 306, a portion of which is shown in FIG. 4.

A source code generation engine 310 uses the new driver description generated by the transformer 306. The engine 310 converts the new driver description into the source code application layer for a driver in the new protocol format. The engine 310 knows how to read the format of the new driver description. The engine 310 then uses the information obtained from the new driver description and applies a template-driven code generation component. The code template is basically a set of prewritten code segments written in the new driver protocol. Tags are placed in the template source code. The engine uses these tags as the location at which the newly generated source code is placed. The content of the generated source code is based upon the new driver description. The application layer that is generated is a skeleton of the driver code in the new architecture. All of the entry points are present, and all of the calls have proper error checking. The missing component is the set of return calls, which is provided by the IHV, as is further described below. In FIG. 3, this application layer is shown stored in database 312. The IHV is shown schematically in FIG. 3 at 314. The IHV 314 accesses the stored application layer and creates the driver protocol layer to complete the skeletal application layer generated by engine 310. It should be understood that the IHV could also alter the engine 310 to build the driver protocol layer template as well. This would allow the IHV to use the above system to develop a complete driver, as opposed to the application layer, in a single pass through the system.

Through the use of the above-described method and system, the creation of device drivers, based upon existing device drivers of a different architecture, is facilitated. A base application layer is easily created for a device driver, given an existing driver of a different architecture. Given such a base application layer, a device provider can more easily port drivers from one architecture to another.

As can be understood, the method and system of the present invention allow a relatively easy conversion from an existing driver into a new driver based on a different architecture.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and with the scope of the claims.

What is claimed is:

1. A computer-implemented method for creation of a new driver for a device using a first architecture, based upon an existing device driver using a second architecture, comprising:

gathering, from the existing device driver, information describing the existing device driver;

converting the gathered information into values understood by the first architecture; and generating, based upon the converted values, source code for the new device driver in the first architecture, wherein the gathered information includes at least the attributes descriptive of the capabilities of the device as well as events and commands supported by the existing device driver, wherein the first architecture is Windows Imagine Acquisition and the second architecture is Technology Without An Interesting Name, and wherein the source code is generated by applying a template of driver application source code, particular to the first architecture, to the converted values.

2. A computer-implemented method as recited in claim 1, further comprising:

storing the gathered information prior to said converting step.

3. A computer-implemented method as recited in claim 1, wherein the converting step includes applying a mapping document to the gathered information that maps values descriptive of the existing device driver to values descriptive of the device driver in the first architecture.

4. A computer-implemented method as recited in claim 3, wherein the generated source code represents a application layer for the new device driver.

5. A computer system having a processor, a memory and an operating environment, the computer system operable to execute the method as recited in claim 1.

6. A computer-readable medium containing instructions for executing the method of claim 1.

7. A computer-implemented method for creation of a device driver application layer for a device in a first architecture, based upon an existing device driver of a second architecture, comprising:

interrogating the existing device driver for information descriptive of the existing device driver capabilities;

converting the existing device driver information into values understood by the first architecture; and generating source code for the new device driver application layer based upon the convened values, wherein the gathered information includes at least the attributes descriptive of the capabilities of the device as well as events and commands supported by the existing driver, wherein the first architecture is Windows Imaging Acquisition and the second architecture is Technology Without An Interesting Name, and wherein the source code is generated by applying a template of driver application layer source code, particular to the first architecture, to the converted values.

8. A computer-implemented method as recited in claim 7, further comprising:

storing the information from the interrogation step in an extensible mark-up language format.

9. A computer-implemented method as recited in claim 7 wherein the converting step includes applying an extensible mark-up language mapping document to the stored information extensible mark-up language document that maps values descriptive of the existing device driver to values descriptive of the device driver in the first architecture.

10. A computer system having a processor, a memory and an operating environment, the computer system operable to execute the method as recited in claim 7.

11. A computerized system having a processor, at least one computer storage medium, and a transformation engine for converting information descriptive of a first device driver for a device in a first architecture to information descriptive of a second device driver in a second architecture, comprising:

a mapping component containing values descriptive of the first device driver in the first architecture and corresponding values descriptive of the second device driver in the second architecture, wherein the values include at least the attributes descriptive of the capabilities of the device as well as events and commands supported by the existing driver, and wherein the mapping component generates source code for the second device driver by applying a template of driver application source code, particular to the second device driver, to the values descriptive of the second device driver.

12. A computer-implemented method for converting information descriptive of a first device driver for a device in a first architecture to information descriptive of a second device driver in a second architecture, comprising:

receiving information descriptive of the device driver in the first architecture;

applying a mapping component to the received information, the mapping component containing values descriptive of the first device driver in the first architecture and corresponding values descriptive of the second device driver in the second architecture; and outputting the values descriptive of the second device driver in the second architecture corresponding to the received information, wherein the received information includes at least the attributes descriptive of the capabilities of the device as well as events and commands supported by the existing driver, and wherein the manning component generates source code for the second device driver by applying a template of driver application source code, particular to the second device driver, to the values descriptive of the second device driver.

13. The computer-implemented method of claim 12, further comprising, storing the outputted information.

14. The computer-implemented method of claim 13, wherein the outputted information is stored in extensible mark-up language format.

\* \* \* \* \*